United States Patent Office 3,631,066
Patented Dec. 28, 1971

3,631,066
4,5-DIHYDRO-2(3H)-OXEPINONE
Chin-Chiun Chu, South Plainfield, N.J., assignor to Mobil Oil Corporation
No Drawing. Filed Jan. 19, 1970, Ser. No. 4,023
Int. Cl. C07d 9/00
U.S. Cl. 260—343     1 Claim

ABSTRACT OF THE DISCLOSURE 4,5 - dihydro-2(3H)-oxepinone, (6-hydroxy-5-hexenoic acid ε-lactone, $\Delta^6$-caprolactone) is presented. It can be converted to ε-caprolactam (a precursor for Nylon-6), 2,3,4,5-tetrahydro-2(1H)-azepinone(6-amino-5-hexenoic acid lactam) which may be prepared by reaction of the lactone with ammonia.

BACKGROUND OF THE INVENTION

Field of the invention

This invention is concerned with a novel lactone.

Description of the prior art

As is described in J. Am. Pharm. Assocn. Sic. Ed. 48, 526 (1959), an effort was made to prepare 4,5-dihydro-2(3H)-oxepinone(6-hydroxy-5-hexenoic acid lactone) by the Bayer-Villiger reaction of 2-cyclohexen-1-one with trifluoroperacetic acid. The only product obtained was 2-hydroxyadipic acid.

SUMMARY OF THE INVENTION

This invention provides 4,5-dihydro-2(3H)-oxepinone-(6-hydroxy-5-hexenoic acid lactone, $\Delta^6$-caprolactone).

DESCRIPTION OF SPECIFIC EMBODIMENTS

The compound of this invention is 4,5-dihydro-2(3H)-oxepinone(6-hydroxy-5-hexenoic acid ε-lactone, $\Delta^6$-caprolactone). It has the structural formula:

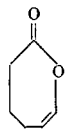

It can be reacted with ammonia at room temperature or slightly higher, in the absence or presence of a solvent, to form 2,3,4,5-tetrahydro-2(1H)-azepinone(6-amino-5-hexenoic acid ε-lactam). This unsaturated lactam is itself a monomer for producing synthetic fibers. It can be hydrogenated to ε-caprolactam by well known hydrogenation methods.

4,5-dihydro-2(3H)-oxepinone is prepared by reacting 2-cyclohexen-1-one with a per-acid of a weak carboxylic acid, such as m-chloroperoxybenzoic acid and peroxy- acetic acid, at room temperature (about 20° C.) up to about 60° C. Chloroform and acetic acid are suitable solvents for the reaction.

The methods for preparing 4,5-dihydro-2(3H)-oxepinone and its recovery are demonstrated in the following examples.

Example 1

To a slurry of 33 g. of m-chloroperbenzoic acid in 200 ml. chloroform stirred at room temperature was added dropwise a solution of 9.6 g. cyclohexenone in 20 ml. of chloroform over a period of 30 minutes. The mixture was stirred for an additional 60 hours. After removal of the precipitate by filtration, acidic products were removed by extraction with sodium bicarbonate solution. The crude product was distilled and the fraction B.P. 50–60°/7 mm. was collected. 4,5-dihydro-2(3H)-oxepinone was then purified by gas chromatography using a 6 foot FFAP column. FFAP is a solid absorbent polyesterification product of polyethylene glycol of about 15,000 M.W. with 2-nitro-terephthalic acid, commonly used in gas chromatography. Yields were 40–45%.

*Analysis.*—Calculated for $C_6H_8O_2$ (percent): C, 64.27; H, 7.19. Found (percent): C, 63.65; H, 7.17.

The IR spectra (1750, 1655–1645, 1120 cm.$^{-1}$), and NMR 6.33 (2 triplets), 5.35 (2 triplets), 2.70 (t.), 2.25 (3 doublets), 1.18 (t.), and mass spectra (parent peak m/e 112) evidence confirms the structure.

Example 2

To a solution of 10 g. cyclohexenone in 50 ml. of acetic acid heated at 60° with stirring was added dropwise 30 g. of 40% peracetic acid solution in acetic acid over a period of 30 minutes. The solution was stirred at 60° for 4 hours and worked up as in Example 1. The yield of 4,5-dihydro-2(3H)-oxepinone was 25%.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claim.

What is claimed is:
1. 4,5-dihydro-2(3H)-oxepinone.

References Cited

UNITED STATES PATENTS 2,417,151   3/1947   Collaud _____ 260—343
3,064,008   11/1962  Phillips et al. _____ 260—343

JOHN M. FORD, Primary Examiner

U.S. Cl. X.R.
260—239.3 R